United States Patent
Dallas

(10) Patent No.: US 7,125,055 B2
(45) Date of Patent: Oct. 24, 2006

(54) METAL RING GASKET FOR A THREADED UNION

(75) Inventor: L. Murray Dallas, Fairview, TX (US)

(73) Assignee: Oil States Energy Services, Inc., Houston, TX (US)

( * ) Notice: Subject to any disclaimer, the term of this patent is extended or adjusted under 35 U.S.C. 154(b) by 0 days.

(21) Appl. No.: 10/690,142

(22) Filed: Oct. 21, 2003

(65) Prior Publication Data

US 2005/0082829 A1  Apr. 21, 2005

(51) Int. Cl.
  *F16L 19/00* (2006.01)
(52) U.S. Cl. .................. 285/354; 285/406; 29/237
(58) Field of Classification Search ............. 285/354, 285/406; 29/237, 282
  See application file for complete search history.

(56) References Cited

U.S. PATENT DOCUMENTS

| | | | | |
|---|---|---|---|---|
| 648,232 | A | * | 4/1900 | Brandt ................. 285/354 |
| 1,137,113 | A | * | 4/1915 | Bouchard .............. 285/354 |
| 1,825,962 | A | | 10/1931 | Laird |
| 2,013,293 | A | * | 9/1935 | Snell et al. ............. 285/354 |
| 2,318,112 | A | * | 5/1943 | Stillwagon ............. 285/354 |
| 2,417,025 | A | * | 3/1947 | Volpin ................. 285/354 |
| 2,417,181 | A | | 3/1947 | Sandilands ............. 166/14 |
| 2,646,996 | A | * | 7/1953 | Parmesan .............. 285/354 |
| 2,705,651 | A | * | 4/1955 | Myers ................. 285/354 |
| 2,780,483 | A | * | 2/1957 | Kessler ................ 285/354 |
| 4,043,575 | A | * | 8/1977 | Roth .................. 285/90 |
| 4,056,272 | A | | 11/1977 | Morrill ................ 285/140 |
| 4,487,434 | A | * | 12/1984 | Roche ................. 285/354 |
| 4,771,832 | A | * | 9/1988 | Bridges ............. 285/148.27 |
| 4,802,695 | A | * | 2/1989 | Weinhold .............. 285/354 |
| 4,832,381 | A | | 5/1989 | Boulton ............... 285/351 |
| 4,919,456 | A | * | 4/1990 | Wong ................. 285/354 |
| 4,921,284 | A | * | 5/1990 | Singeetham ........... 285/354 |
| 5,016,920 | A | * | 5/1991 | Anderson ............. 285/354 |
| 5,251,941 | A | * | 10/1993 | McGarvey ............ 285/354 |
| 5,257,792 | A | | 11/1993 | Putch et al. ........... 277/236 |
| 5,284,320 | A | | 2/1994 | Michael et al. ......... 251/304 |
| 5,505,498 | A | | 4/1996 | Halling et al. ......... 285/111 |
| 5,553,902 | A | * | 9/1996 | Powers ............... 285/354 |
| 6,145,596 | A | | 11/2000 | Dallas ................ 166/379 |

(Continued)

FOREIGN PATENT DOCUMENTS

WO  WO 89/03495  *  4/1989  ............ 285/354

OTHER PUBLICATIONS

Product description "S Elastomer Seal," Cooper Cameron Corporation Internet Homepage located at www.cameondiv.com.

(Continued)

*Primary Examiner*—David Bochna
(74) *Attorney, Agent, or Firm*—Nelson Mullins Riley & Scarborough, LLP

(57) ABSTRACT

A metal ring gasket for a threaded union provides a high-pressure, fluid-tight, metal-to-metal seal between subcomponents of a fluid conduit. The metal ring gasket is made of carbon steel or stainless steel depending on a composition of the fluid to be conveyed through the conduit. The metal ring gasket has beveled corners and is received in a beveled annular groove on mating surfaces of the subcomponents of the threaded union. When compressed in the annular groove between the subcomponents, the metal ring gasket creates an energized, high-pressure, fluid-tight seal that is highly resistant to pressure and is capable of maintaining a seal even at elevated temperatures resulting from direct exposure of the fluid conduit to fire.

23 Claims, 5 Drawing Sheets

U.S. PATENT DOCUMENTS 6,764,109 B1 * 7/2004 Richardson et al. ........ 285/354
6,769,489 B1   8/2004 Dallas ........................ 166/386

OTHER PUBLICATIONS

Techdrill Limited "Hammer Lug Unions," Internet information located at www.techdrill.co.uk.

Anson "Hammer Lug Union Specifications," Internet information located at www.anson.co.uk.

Anson "Hammer Lug Unions—Seals," Internet information located at www.anson.co.uk.

C&C Industries LLC "Hammer Unions," Internet information located at www.candcvalve.com.

U.S. Appl. No. 10/656,693 entitled "Drilling Flange and Independent Screwed Wellhead with Metal-to-Metal Seal and Method of Use," filed Sep. 4, 2003.

U.S. Appl. No. 10/162,803 entitled "Reciprocating Lubricator," filed Jun. 3, 2002.

U.S. Appl. No. 10/440,795 entitled "Casing Mandrel with Well Stimulation Tool and Tubing Head Spool for Use with the Casing Mandrel," filed May 19, 2003.

U.S. Appl. No. 10/607,921 entitled "Multi-Lock Adapters for Independent Screwed Wellheads and Methods of Using Same," filed Jun. 27, 2003.

* cited by examiner

METAL RING GASKET FOR A THREADED UNION

CROSS-REFERENCE TO RELATED APPLICATIONS

This is the first application filed for the present invention.

MICROFICHE APPENDIX

Not Applicable.

TECHNICAL FIELD

The present invention relates generally to sealed joints for high pressure fluid conduits and, in particular, to a metal ring gasket for threaded unions for use in wellheads and wellhead control stack assemblies.

BACKGROUND OF THE INVENTION

Threaded unions are used to provide fluid-tight joints in fluid conduits. Threaded unions are held together by a threaded nut that is tightened to a required torque using a wrench or a hammer. In the oil industry, threaded unions are generally constructed using "wing nuts" and are commonly called "hammer unions" or "hammer lug unions". Hammer unions are designed and manufactured in accordance with the specifications stipulated by the American Petroleum Institute in API 6A entitled "Specification for Wellhead and Christmas Tree Equipment". Hammer unions are usually available in a variety of sizes (1" to 10") and a variety of pressure ratings (1000 psi to over 20,000 psi).

As illustrated in FIG. 1, a typical prior-art hammer union 10 includes a first subcomponent 12 and a second subcomponent 14. The first subcomponent has an inner lateral surface 13 which abuts an outer lateral surface 15 of the second subcomponent. The first subcomponent has at least one annular groove 16 for receiving an elastomeric O-ring 18. The annular groove is located at an interface of the inner and outer lateral surfaces. The second subcomponent is secured to the first subcomponent by a wing nut 20.

The wing nut 20 has box threads 22 that engage pin threads of the first subcomponent. The wing nut 20 further includes a plurality of lugs 24 that extend radially from a main body of the wing nut 20. The lugs have impact surfaces 25 which may be impact-torqued using a hammer or mallet (not shown) to tighten or loosen the wing nut 20.

The wing nut 20 also has an annular top wall 26 which abuts a radial flange 28 of the second subcomponent. When torque is applied to the wing nut, the annular top wall 26 is forced downwardly on the radial flange 28, thereby locking together the second subcomponent and the first subcomponent.

The hammer union 10 is shown with an elastomeric O-ring 18 having a circular cross-section. In the prior art, the O-rings are made of materials such as rubber, nylon, polyurethane and Teflon™.

Depending on the nature and shape of the first and second subcomponents, a different type of elastomeric seal may be used. For example, lip seals and flat gaskets may be used instead of the O-ring shown in FIG. 1. For sour service wells, the lips seals and O-rings are typically made of nitrile rubber (NBR) and fluroelastomers (FPM). Elastomeric seals may also be energized using stainless steel garter springs to prevent the seal from being damaged by extrusion.

FIG. 2 is a schematic cross-sectional view of a prior art hammer union manufactured by FMC/Weco that utilizes a lip seal. The hammer union shown in FIG. 2 is very much like the hammer union shown in FIG. 1, with the exception that the high-pressure seal is provided by the lip seal 17, which includes a peripheral lip 19 that is received in a groove 21 at a bottom of a seal seat 23 in the first subcomponent 12. The lip seal 17 is made of a rubber composition, and the hammer union is rated for up to 15,000 psi of fluid pressure.

One substantial disadvantage of prior-art hammer unions is that their elastomeric seals are vulnerable to the extreme temperatures generated by fire. In the event that a fire erupts in the well or at the wellhead, the elastomeric seal in the hammer union may leak or fail completely. This permits hydrocarbons to escape to the atmosphere, which may exacerbate the fire.

To the best of the applicant's knowledge, a prior art hammer union with a metal-to-metal seal for providing a high-pressure, fluid-tight seal has never been designed or manufactured. While metal seals and metallic gaskets are known in the art (e.g. U.S. Pat. No. 4,832,381 (Boulton) entitled "Seal", U.S. Pat. No. 5,257,792 (Putch et al.) entitled "Well Head Metal Seal", U.S. Pat. No. 4,056,272 (Morrill) entitled "Seal", and U.S. Pat. No. 1,825,962 (Laird) entitled "Gasket") but each of the above describes a seal for a flanged union. While flanged unions are widely used in well trees, they are relatively expensive to construct and time consuming to assemble in the field.

It is well known in the art that there is increasing pressure on the oil industry to produce hydrocarbons at a lower cost. Consequently, an interest has developed in utilizing wellhead equipment that is less expensive to construct and is more quickly assembled than prior art flanged well tree components. Threaded unions provide a good alternative to flanged unions from a cost standpoint because they are faster to assemble and less expensive to construct. However, due to safety concerns related to the lack of a metal-to-metal seal, use of threaded unions for well tree components has not been endorsed.

Therefore, there exists a need for a threaded union with a metal-to-metal seal.

SUMMARY OF THE INVENTION

It is therefore an object of the present invention to provide a high-pressure, fluid-tight, metal-to-metal seal for a threaded union.

It is another object of the invention to provide a metal ring gasket for a threaded union that provides a reliable high-pressure seal.

It is a further object of the invention to provide a threaded union that is suitable for use in applications where an elevated temperature tolerance of a metal-to-metal seal is required.

The invention therefore provides a threaded union, comprising first and second subcomponents that are inter-connected by a threaded nut, the first and second subcomponents having respective mating ends with complementary ring gasket grooves therein, and a metal ring gasket received in the complementary ring gasket grooves, the metal ring gasket providing a high-pressure seal between the mating ends of the first and second subcomponents when securely interconnected by the threaded nut.

In one embodiment of the threaded union, the nut is a wing nut that is hammer-torqued in a manner well known in the art.

In another embodiment of the threaded union, the nut is a spanner nut that is torqued using a wrench.

The invention further provides a threaded union for providing a high-pressure, fluid-tight, metal-to-metal seal in a fluid conduit. The threaded union comprises a first subcomponent, which is a generally annular body that includes a first mating end with pin threads; a threaded nut having an annular top wall and box threads for engaging the pin threads on the mating end of the first subcomponent; a second subcomponent comprising a generally annular body that includes a second mating end with a radial flange against which the annular top wall of the threaded nut abuts so that the first and second mating ends are forced together when the box threads of the threaded nut engage the pin threads of the first subcomponent; and a metal ring gasket compressed between the first subcomponent and the second subcomponent to form a high-pressure, fluid-tight, metal-to-metal seal between the first subcomponent and the second subcomponent.

In one embodiment, the metal ring gasket is seated in an annular groove in the mating end of the first subcomponent. In one embodiment, the annular groove has beveled sides. The sides are beveled to an angle of 20 to 26 degrees from the vertical. In one embodiment, the annular groove is beveled to an angle of 23 degrees from the vertical, plus or minus 1 degree. In one embodiment, the second subcomponent has a beveled annular groove with a bevel angle equal to an upper bevel angle of the metal ring gasket.

In one embodiment of the threaded union, the threaded nut is a wing nut that includes hammer lugs to permit the threaded nut to be tightened using a hammer.

In another embodiment of the threaded union, the threaded nut is a spanner nut that is tightened using a wrench.

The threaded union in accordance with the invention can be used to construct wellhead components, well tree components, or joints in any fluid conduit subject to high fluid pressures.

The invention further provides a metal ring gasket for use as a metal-to-metal seal in a threaded union, the metal ring gasket comprising a generally annular body having a substantially flat top surface and a substantially flat bottom surface for being deformably compressed between first and second subcomponents of the threaded union.

The metal ring gasket is made of a metal having a ductility which exhibits at least 40% reduction in cross-sectional area at a fracture load.

In one embodiment, corners of the metal ring gasket are beveled and the metal ring gasket has an octagonal cross-section.

The invention also provides a method of providing a fluid seal between first and second components of a threaded union. The method comprises seating a metal ring gasket in an annular groove in mating surfaces of the first and second subcomponents of the threaded union; and securing the first and second subcomponents together using a threaded nut by tightening the threaded nut, wherein a high-pressure, fluid-tight seal between the first and second subcomponents is achieved by compressing the metal ring gasket between the mating surfaces of the first and second subcomponents.

The step of securing the second subcomponent to the first subcomponent by tightening the threaded nut may be accomplished by hammering lugs on the threaded nut or tightening the threaded nut using a spanner wrench.

If a spanner wrench is used the spanner wrench may be a torque wrench to permit the threaded nut to be tightened to a predetermined torque force.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF PREFERRED EMBODIMENTS

The invention provides a threaded union with a metal ring gasket to provide a high-pressure, fluid-tight, metal-to-metal seal between a first subcomponent and a second subcomponent of the threaded union. The metal ring gasket is made of a ductile, carbon steel for sweet well service or ductile, stainless steel for sour well service. The metal ring gasket is beveled and sits in a beveled annular groove in a mating end of the first subcomponent. When compressed between the mating ends of the first and the second subcomponents, the metal ring gasket deforms to create a high-pressure, energized fluid-tight seal. The high-pressure seal is capable of withstanding pressures of up to at least 22,500 pounds per square inch (psi), and is not affected by elevated temperatures below a melting point of the ductile steel of the metal ring gasket. Throughout this specification, the terms "first subcomponent" and "second subcomponent" are meant to denote any two contiguous components of a joint in a fluid conduit that are joined together using a threaded nut.

Figure 3:
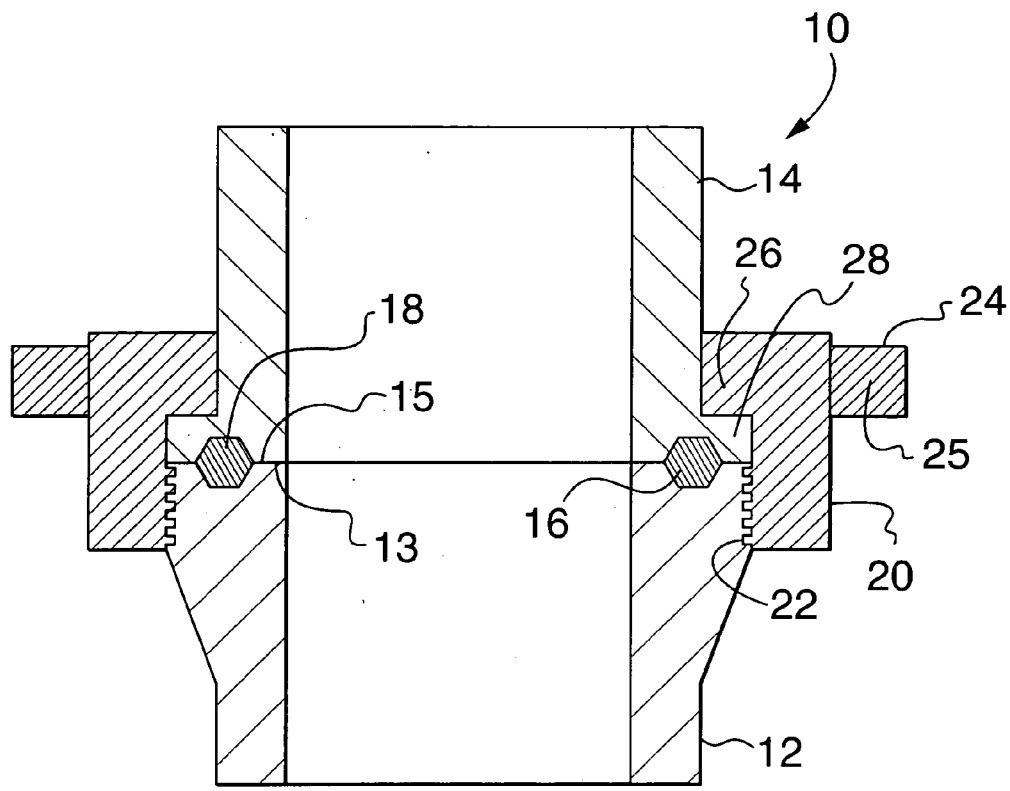
FIG. 3 is a cross-sectional view of a threaded union equipped with a metal ring gasket in accordance with the present invention.

As illustrated in FIG. 3, a threaded union 10 in accordance with a first embodiment of the invention includes a first subcomponent 12 and a second subcomponent 14. The first subcomponent has a mating end 13 that abuts a mating end 15 of the second subcomponent. The first subcomponent has an annular groove 16 in the top surface for receiving a metal ring gasket 18 in accordance with the invention. The second subcomponent is secured to the first subcomponent by a threaded nut 20.

The threaded nut 20 has box threads 22 for engaging pin threads on the mating end of the first subcomponent 12. In one embodiment, the threaded nut 20 is a wing nut and includes a plurality of lugs 24 that extend radially from a main body of the threaded nut 20. The lugs 24 have impact surfaces 25 which may be impact-torqued using a hammer or mallet (not shown) in the usual way in which a hammer union is "hammered up". In another embodiment, the threaded nut 20 is a "spanner nut" that includes flats 27 or bores, or the like, that are gripped by a spanner wrench (not shown) to permit the threaded nut 20 to be tightened to a required torque. As will be understood by those skilled in the art, the wrench used to tighten the nut may be a torque wrench, which indicates the torque applied to the threaded nut 20 to ensure that it is tightened with a precise amount of force.

The threaded nut 20 also has an annular top wall 26 that abuts a radial flange 28 on an outer wall of the second subcomponent 14. When torque is applied to the wing nut 20, the annular top wall is forced downwardly on the radial flange, thereby compressing the metal ring gasket 18 between the mating end 13 of the second subcomponent and the mating end 15 of the first subcomponent.

Figure 4:
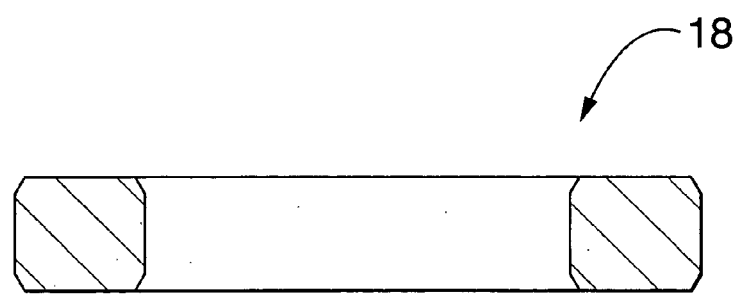
FIG. 4 is a cross-sectional view of a metal ring gasket for use in a threaded union in accordance with the present invention.

As shown in FIG. 4, the metal ring gasket 18 has beveled corners and an octagonal cross-section. In one embodiment, the corners of the metal ring gasket are beveled an angle of 23°±1°. Persons skilled in the art will appreciate that the bevel angle may be changed within limits without unduly affecting the integrity of the seal. The metal ring gasket is preferably made of steel. Plain carbon steel or stainless steel is selected depending on whether a well to be serviced is "sweet" or "sour".

For sweet well service, where corrosion is not generally problematic, AISI 1018 nickel-plated cold-drawn steel may be used. The AISI 1018 steel has a carbon content of 0.18% (although it may vary from 0.14% to 0.20%), a manganese content of 0.6% to 0.9%, a maximum phosphorus content of 0.04% and a maximum sulfur content of 0.05%. The AISI 1018 steel exhibits high machinability (its average machinability rating is 70%), good fracture toughness, good surface hardness (126 HB), high tensile strength (440 MPa), high yield strength (370 MPa), superior ductility (40–50% reduction in cross-sectional area at the fracture load) and is relatively inexpensive. Alternatively, other plain carbon steels may be substituted, provided they have approximately similar mechanical properties.

For sour well service, where corrosion is highly problematic, the metal ring gasket may be made using either AISI 316 stainless steel or AISI 304 stainless steel. Not only are these stainless steels corrosion-resistant but they also possess desirable mechanical properties (in terms of machinability, fracture toughness, surface hardness, tensile strength and yield strength).

Alternatively, persons skilled in the art will appreciate that, for certain applications, the metal ring gaskets in accordance with the invention may be made using metals other than steel (such as aluminum or copper alloys like brass or bronze, for example), which are more temperature-resistant than elastomeric gaskets.

Figure 5A:
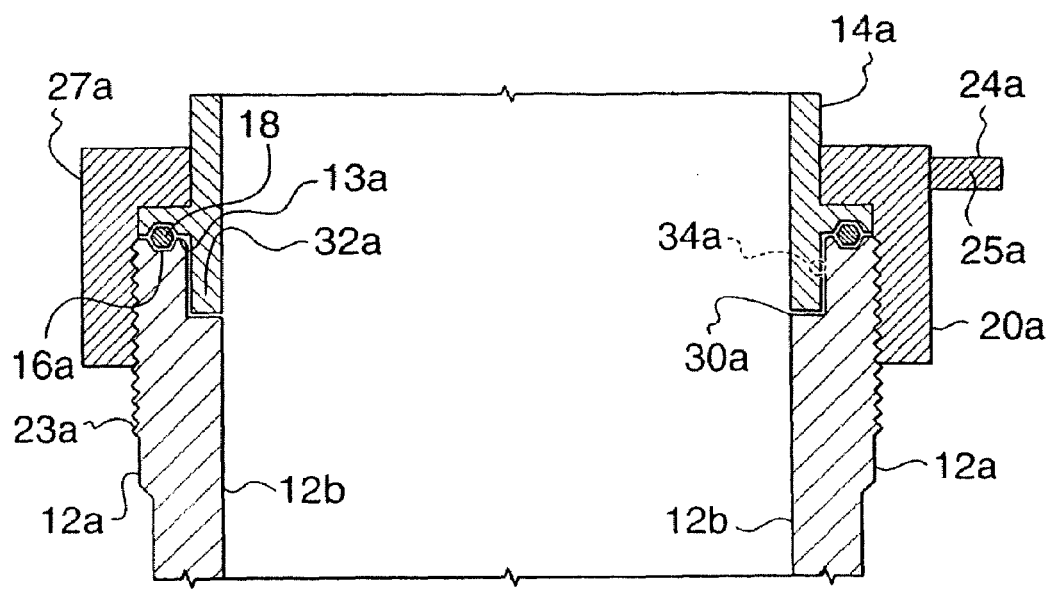
FIG. 5a is a cross-sectional schematic view of a second embodiment of a threaded union in accordance with the invention.
Figure 5B:
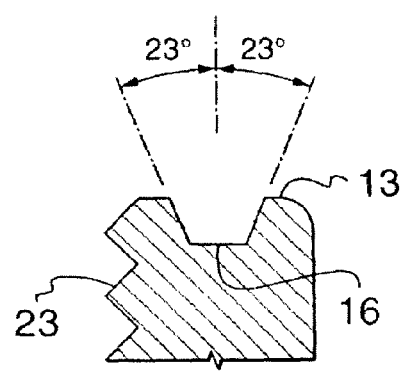
FIG. 5b is an enlarged cross-sectional schematic view of a metal ring gasket groove in a subcomponent of a threaded union in accordance with the invention.

FIG. 5a is a schematic cross-sectional diagram of another embodiment of a threaded union and a metal ring gasket in accordance with the invention. The threaded union shown in FIG. 5a includes a first subcomponent 12a and a second subcomponent 14a. The first subcomponent 12a has a mating end 13a that abuts a mating end 15a of the second subcomponent 14a. The first subcomponent 12a has an annular groove 16a in the top surface for receiving a metal ring gasket 18 in accordance with the invention. The second subcomponent 14a is secured to the first subcomponent by a threaded nut 20a.

Figure 1:
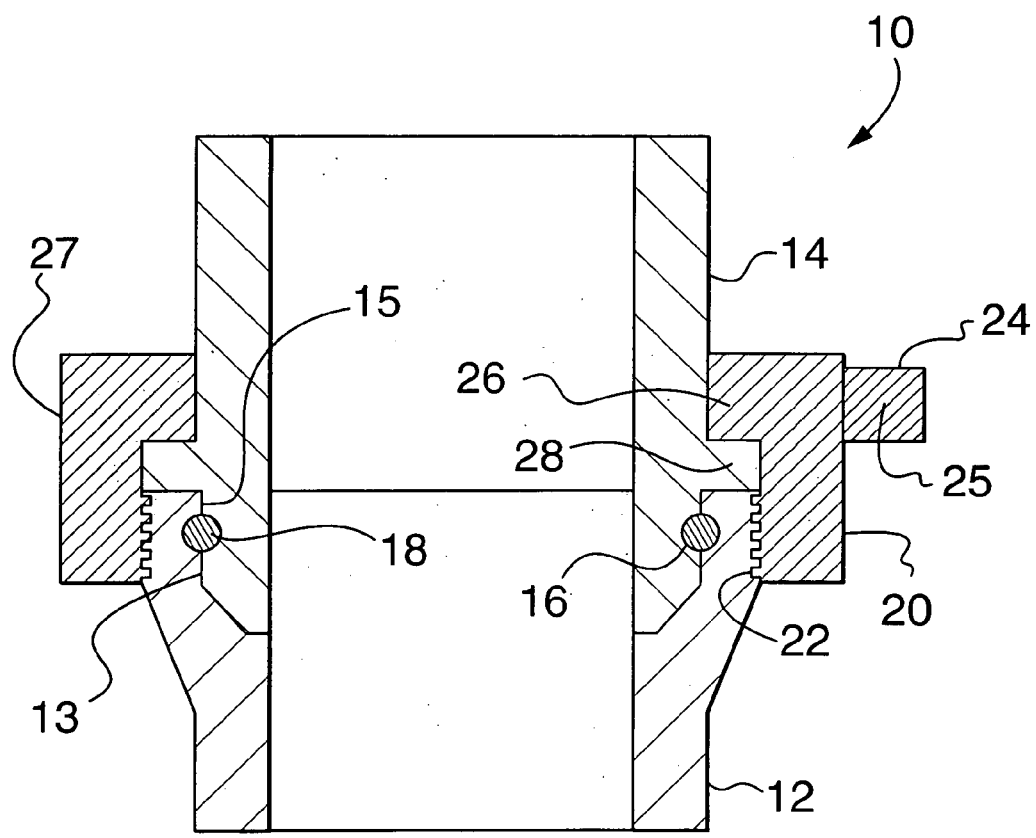
FIG. 1 is a cross-sectional view of a hammer union equipped with an elastomeric seal as found in the prior art.
Figure 2:
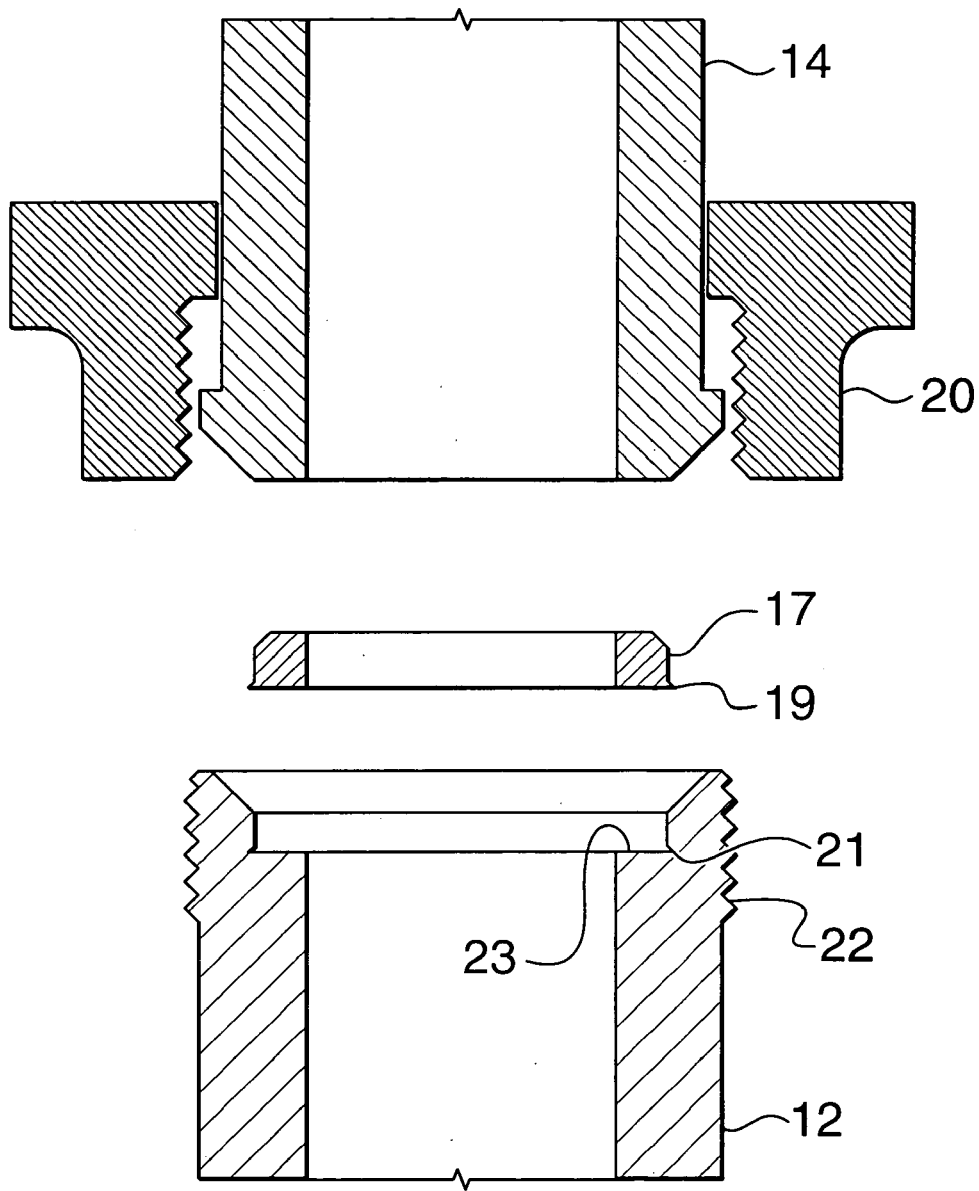
FIG. 2 is a cross-sectional view of another well known prior art hammer union.

The nut 20a has box threads 22a for engaging pin threads 23a on the mating end 13a of the first subcomponent 12a. In one embodiment, the threaded nut 20a further includes a plurality of lugs 24a that extend radially from a main body of the threaded nut 20a. The lugs 24a have impact surfaces 25a, which may be impact-torqued using a hammer or mallet (not shown) in the usual way in which a hammer union is "hammered up". In another embodiment, the threaded nut 20a includes the flats 27a used to grip the threaded nut using a wrench, which may be a torque wrench, as explained above with reference to FIG. 2.

The first subcomponent 12a and the second subcomponent 14a are identical to those described above with reference to FIG. 3 with the exception that the first subcomponent 12a includes a female socket, which is an annular recess 30a that receives a cylindrical male pin 32a of the second subcomponent 14a. The male pin 32a/female socket 30a facilitate assembly of the first and second subcomponents 12a, 14a by serving as an alignment guide, and provide stability to the union while the threaded nut 20a is being tightened. The male subcomponent may optionally include one or more peripheral grooves that receive an O-ring 34a. The O-rings 34a provide a backup to the metal ring gasket 18. It should be noted, however, that during extensive testing the metal ring gasket has not leaked or failed.

Figure 6:
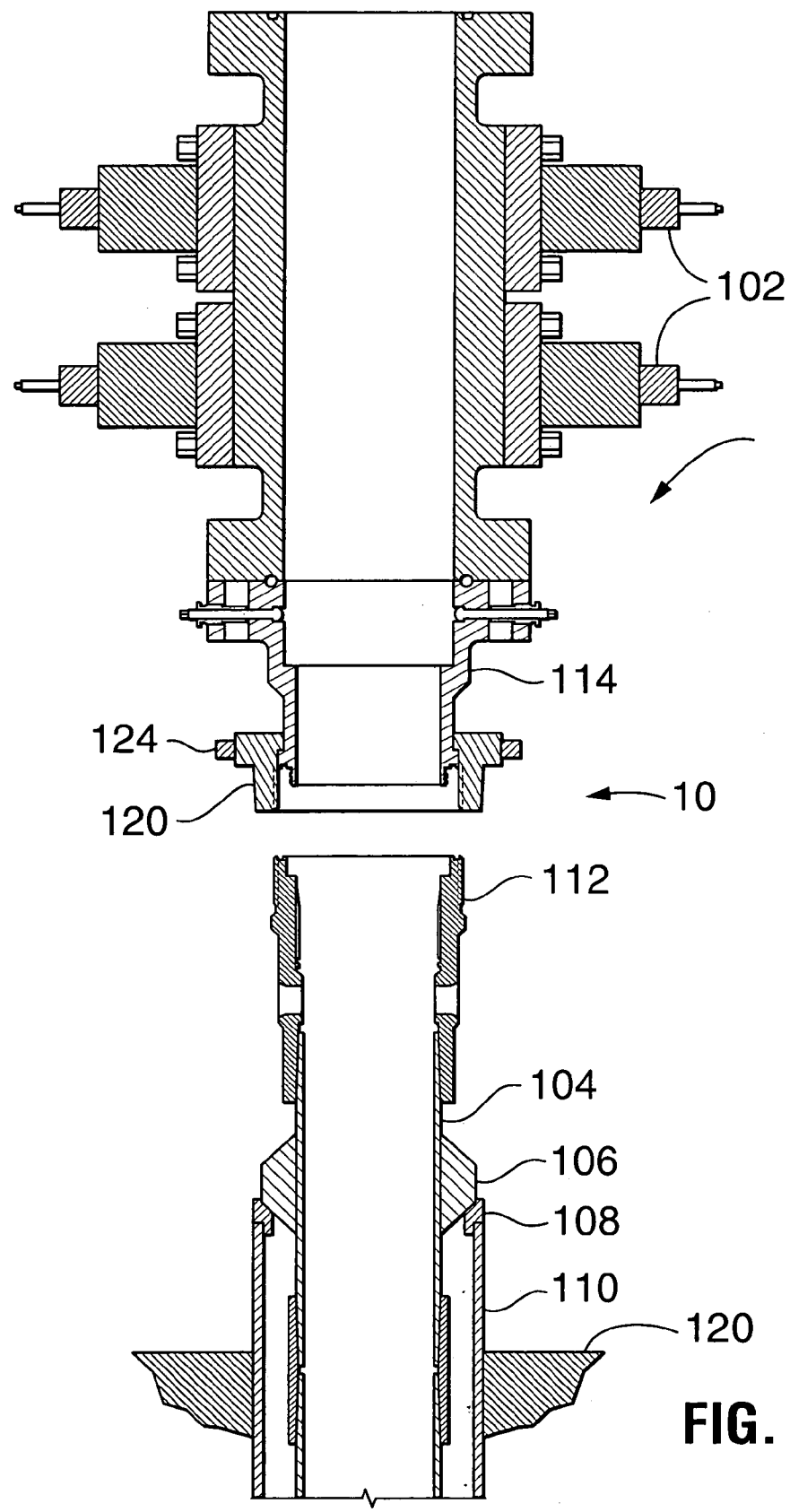
FIG. 6 is a cross-sectional view of a wellhead control stack assembly equipped with a threaded union in accordance with the invention for securing a drilling flange to the wellhead.

As illustrated in FIG. 6, the threaded union 10 in accordance with the present invention may be used to construct a high-pressure, fluid-tight seal between a drilling flange 114, described in applicant's co-pending patent application Ser. No. 10/656,693 filed Sep. 4, 2003, the entire disclosure of which is incorporated by reference herein, and a wellhead 112 on a wellhead assembly 100. In this example, the wellhead 112 is the first subcomponent whereas the drilling flange 114 is the second subcomponent. The drilling flange is secured to the wellhead 112 with a wing nut 120 having lugs 124. The wing nut compresses a metal ring gasket between the drilling flange and the wellhead. The wellhead assembly 100 includes a pair of blowout preventers 102 mounted atop the drilling flange 114. The wellhead assembly 100 further includes a surface casing 104 which supports the wellhead 112. Landing lugs 106 on the surface casing are supported on a conductor ring 108 that is supported atop a conductor 110, which is dug into the ground 120.

The metal ring gasket in accordance with the invention has been extensively pressure tested in a number of threaded unions constructed between different wellhead components. Surprisingly, it is extremely reliable and provides a very high-pressure energized seal that is easy to "torque up" using a hammer or a wrench. This permits wellhead components to be more economically constructed and more quickly assembled in the field. Cost savings are therefore realized, while worker safety and environmental protection are ensured.

As will be understood in the art, the metal ring gasket for the threaded union, and the threaded union that the metal ring gasket enables can be used in a variety of applications to reduce cost, while ensuring high performance and safety in fluid conduits of all types, including wellhead assemblies and well stimulation equipment, where high pressure and high temperature resistance are especially important.

The embodiments of the invention described above are therefore intended to be exemplary only. The scope of the invention is intended to be limited solely by the scope of the appended claims.

I claim:

1. A threaded union, comprising:
   first and second subcomponents that are inter-connected by a nut, the first and second subcomponents having respective mating ends that are forced together and abut when securely interconnected by the nut, the first subcomponent including a female socket that receives a cylindrical male pin of the and second subcomponent, the first and second subcomponents having complementary ring gasket grooves in the mating ends; and a metal ring gasket having beveled corners and an octagonal cross-section received in the complementary ring gasket grooves, the metal ring gasket providing a high-pressure energized seal between the mating ends of the first and second subcomponents when securely interconnected by the nut.

2. The threaded union as claimed in claim 1 wherein the nut is a wing nut that is hammer-torqued.

3. The threaded union as claimed in claim 1 wherein the nut is a spanner nut that is torqued using a wrench.

4. A threaded union for providing a high-pressure, fluid-tight, metal-to-metal seal in a fluid conduit, comprising:

a first subcomponent comprising a generally annular body that includes a female socket inside a first mating end with pin threads;

a threaded nut having an annular top wall and box threads for engaging the pin threads on the mating end of the first subcomponent;

a second subcomponent comprising a generally annular body that includes a male pin that extends from a second mating end and a radial flange against which the annular top wall of the threaded nut abuts so that the first and second mating ends are forced together and abut when the male pin is received in the female socket and the box threads of the threaded nut engage the pin threads of the first subcomponent; and a metal ring gasket having beveled corners and an octagonal cross-section that is compressed between the first subcomponent and the second subcomponent to form a pressure energized, high-pressure, fluid-tight, metal-to-metal seal between the first subcomponent and the second subcomponent when the mating ends abut.

5. The threaded union as claimed in claim 4 wherein the metal ring gasket is compressed between the mating ends of the first and second subcomponents.

6. The threaded union as claimed in claim 5 wherein the metal ring gasket is seated in an annular groove in the mating end of the first subcomponent.

7. The threaded union as claimed in claim 6 wherein the annular groove has beveled sides.

8. The threaded union as claimed in claim 7 wherein the annular groove is beveled to an angle of 20 to 26 degrees from the vertical.

9. The threaded union as claimed in claim 8 wherein the annular groove is beveled to an angle of 23 degrees from the vertical, plus or minus 1 degree.

10. The threaded union as claimed in claim 9 wherein the second subcomponent has a beveled annular groove having a bevel angle equal to an upper bevel angle of the metal ring gasket.

11. The threaded union as claimed in claim 4 wherein the threaded nut is a wing nut that includes hammer lugs to permit the threaded nut to be tightened using a hammer.

12. The threaded union as claimed in claim 4 wherein the threaded nut is a spanner nut that is tightened using a wrench.

13. The threaded union as claimed in claim 4 wherein the first subcomponent is a wellhead and the second subcomponent is a drilling flange.

14. The threaded union as claimed in claim 4 wherein the first subcomponent is a wellhead and the second subcomponent is a casing mandrel.

15. The threaded union as claimed in claim 4 wherein the metal ring gasket is made of steel.

16. The threaded union as claimed in claim 15 wherein the metal ring gasket is made of plain carbon steel with a carbon content ranging from 0.14% to 0.20%.

17. The threaded union as claimed in claim 16 wherein the metal ring gasket is made of AISI 1018 nickel-plated steel.

18. The threaded union as claimed in claim 16 wherein the metal ring gasket is made of stainless steel for use in sour service wells.

19. The threaded union as claimed in claim 18 wherein the stainless steel is one of AISI 316 stainless steel and AISI 304 stainless steel.

20. A method of providing a fluid seal between first and second components of a threaded union, the method comprising:

seating a metal ring gasket having beveled corners and an octagonal cross-section in an annular groove in mating ends of the first and second subcomponents of the threaded union;

inserting a male pin of the second subcomponent into a female socket of the first subcomponent; and securing the first and second subcomponents together using a threaded nut by tightening the threaded nut until the mating ends of the first and second components are forced together and abut, wherein a pressure energized, high-pressure, fluid-tight seal between the first and second subcomponents is achieved by compressing the metal ring gasket between the mating ends of the first and second subcomponents until the mating ends abut.

21. The method as claimed in claim 20 wherein the step of securing the second subcomponent to the first subcomponent by tightening the threaded nut comprises hammering lugs on the threaded nut.

22. The method as claimed in claim 20 wherein the step of securing the second subcomponent to the first subcomponent by tightening the threaded nut comprises using a spanner wrench to tighten the threaded nut.

23. The method as claimed in claim 20 wherein the step of using the spanner wrench comprises using a torque wrench to tighten the threaded nut to a predetermined torque.

* * * * *